July 9, 1940.   B. LOOPER   2,207,323
BLADE SHARPENER FOR LAWN MOWERS
Filed Aug. 18, 1939
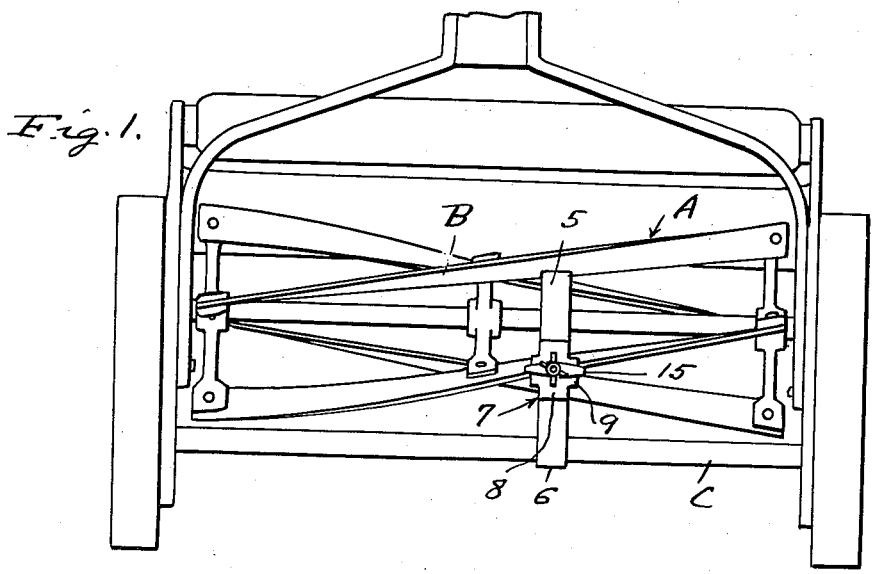
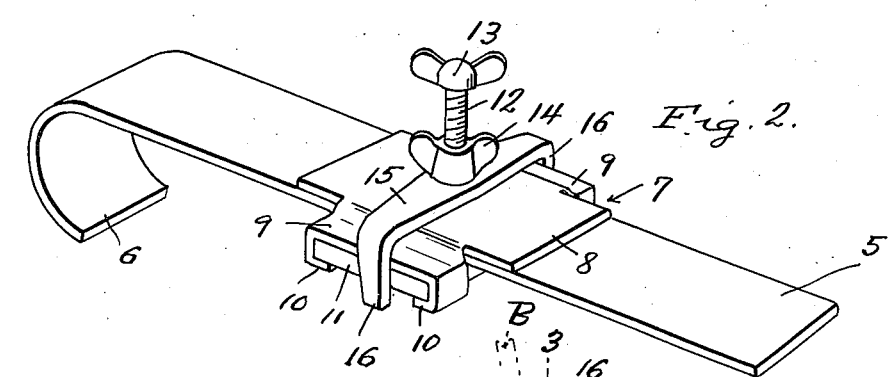
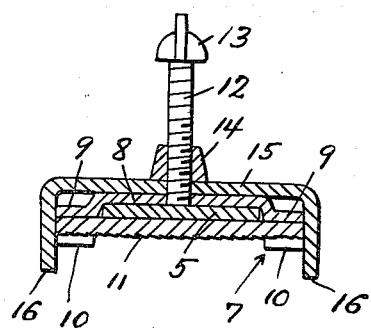
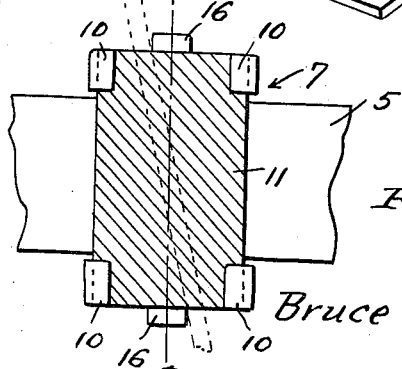
Inventor
Bruce Looper
By Clarence A. O'Brien
and Hyman Berman
Attorneys Patented July 9, 1940

2,207,323

UNITED STATES PATENT OFFICE 2,207,323

BLADE SHARPENER FOR LAWN MOWERS

Bruce Looper, Rosenberg, Tex.

Application August 18, 1939, Serial No. 290,893

2 Claims. (Cl. 76—82.1)

The present invention relates to a novel and improved lawn mower attachment of the type equipped with a file or equivalent sharpener adapted to be shiftably mounted on the frame of the lawn mower in a position to re-face and sharpen the cutting edges of conventional rotary reel blades, and the essential object in bringing into being this improved device is to promote progress in this specific line of endeavor by structurally and otherwise improving upon similar known and patented contrivances utilized for the same general purpose.

As implied in the preceding opening statement of the invention, I am sufficiently conversant with the general state of the prior art to realize and appreciate that divers styles and forms of sharpener attachments have been devised and employed by my predecessors. Despite this fact, I have nevertheless, structurally designed a variation which, as a whole, appears to me to more aptly fit the needs and demands of the trade and users. Briefly, the preferred embodiment of the invention perfected with these ends in view is characterized by a quick attachable frame, this having thereon a longitudinally adjustable file holding unit constituting a mount for a yoke-like guide adequately performing and permitting the file to satisfactorily and suitably co-act with the curvate cutting edges of the reel blades.

Other features and advantages will become more readily apparent from the following description and the accompanying illustrative drawing.

In the accompanying drawing, not necessarily restrictive, wherein like reference numerals are employed to designate like details and parts throughout the views:

Figure 1 is an elevational view depicting what may be called a conventional reel type lawn mower, the improved sharpener attachment being shown in position thereon in readiness for use.

Figure 2 is a perspective view of the attachment per se illustrating to advantage the details forming the preferred embodiment of the inventive concept.

Figure 3 is a detail cross-sectional view taken approximately on the plane of the line 3—3 of Figure 4.

Figure 4 is a fragmentary bottom plan view conveniently exposing the sharpener or file, and retention fingers of the guide yoke.

Referring now to the drawing by distinguishing reference numerals, and first to Figure 1, the lawn mower embodies a rotary reel A having the customary twisted and curved blades B, and including a frame embodying a horizontal rod or bar C identified in that it serves as the foundation or support for the sharpener attachment.

The attachment comprises a frame unit and a shiftable slide thereon, including a guide and retention means for the abradant element. The frame comprises an elongated metal strap of appropriate dimensions, said strap 5 having one end formed with a return bend 6 defining a slidable shoe. The shoe, in practice, is adapted to embrace the rod C to position the attachment in appropriate relation to the reel blades B. The adjustable carrier or slide unit 7 is characterized by a substantially rectangular plate 8, this being superimposed upon the metal strap 5 and being of a width corresponding thereto. Along opposite longitudinal edges the plate is provided with downwardly or laterally offset adapter clamps 9, these being fashioned with retention lugs 10 to embrace and hold in place the file or equivalent sharpener 11. With this arrangement the file bears against one face of the strap 5 and the plate 8 against the opposite face, the file extending transversely to the longitudinal dimension of the strap. A set or binding screw 12 is threaded through an opening in the plate 8 and engages the strap 5, whereby to bind the file between said strap and retention lugs or jaws 10. This set-screw is provided with a suitable finger grip 13 and carries a nut 14 to hold in place the yoke-like guide member 15. The bight portion of the guide is centrally apertured to permit passage therethrough of the set-screw 12. The laterally directed ends 16 are proportioned to project beyond the file 11 and retention elements 10, whereby to permit the same to straddle the opposite longitudinal edges of the adjacent cutting blade. It is to be noted in this connection that these guide fingers 16 squarely contact the adjacent surfaces of the adapters 9 and file 11 to prevent rotation of said guide unit 15. It is further evident that the nut 14 clamps the guide unit securely in place, that is, in a position superimposed upon the carrier plate 8.

In practice it is obvious that the shiftable hook-like shoe 6 is engaged with the frame rod C disposing the strap 5 at right angles thereto and in a position to bring the file into play in relation to the reel blades. The set-screw 12 is loosened and the unit 7 is shifted on the strap 5 to its most satisfactory position for sharpening purposes. It is then tightened to insure effective results. The thumb-nut 14 is also tightened, this to hold the guide fingers 16 in opposed riding contact with the upper and lower curvate faces of the blades. As is evident, with attachments in this classification, after the reel A is loosened to idle freely, the sharpener attachment is reciprocated or shifted back and forth, by hand, to obtain the desired results.

As previously stated, I am aware that a reciprocatory frame having adjustable abradant means thereon and coacting guides for the blades is old. So far as I have been able to ascertain, however, novelty resides, as pointed out in the claims, in the hooked simple strap element 5 and the consolidated guide and abradant equipped unit 7.

It is thought that the description taken in connection with the drawing will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. As a component part of an assemblage of the class described, a carrier comprising a plate having a screw-threaded opening and laterally offset clamping adapters, a renewable file removably mounted in said adapters and disposed in parallelism to said plate, a U-shaped guide member, the bight portion being superimposed upon said plate and having an opening in registry with said screw-threaded opening, the laterally directed ends thereof embracing and projecting beyond said adapter clamps, a binding screw extending through the opening in said bight portion and into the screw threaded opening in said plate, and a thumb-nut on said screw engageable with said apertured bight portion.

2. A lawn mower blade sharpening attachment of the class described comprising a longitudinally elongated flat faced metal strap having a return-bend at one end defining a mower frame engaging attachment retention hook, a substantially rectangular plate slidably superimposed upon one surface of said strap member, said plate being of a width corresponding to the transverse width of the strap and having at opposite longitudinal edges a pair of duplicate reduced and laterally offset file clamping members, said clamping members having inturned hooked lugs engageable with adjacent corner portions of the file, said plate having a screw-threaded opening formed therein, a U-shaped guide member, the bight portion being superimposed upon said plate and having an opening in registry with said screw-threaded opening, the laterally directed ends thereof embracing and projecting beyond said file clamping members, a binding screw extending through the opening in said bight portion and into the screw-threaded opening in said plate, and thumb nut on said binding screw engageable with said apertured bight portion.

BRUCE LOOPER.